United States Patent
Kaul et al.

(10) Patent No.: US 9,680,765 B2
(45) Date of Patent: Jun. 13, 2017

(54) SPATIALLY DIVIDED CIRCUIT-SWITCHED CHANNELS FOR A NETWORK-ON-CHIP

(71) Applicant: Intel Corporation, Santa Clara, CA (US)

(72) Inventors: Himanshu Kaul, Portland, OR (US); Gregory K. Chen, Portland, OR (US); Mark A. Anders, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 14/574,258

(22) Filed: Dec. 17, 2014

(65) Prior Publication Data

US 2016/0182396 A1  Jun. 23, 2016

(51) Int. Cl.
| | | |
|---|---|---|
| H04L 12/58 | (2006.01) | |
| H04L 12/913 | (2013.01) | |
| H04L 12/933 | (2013.01) | |
| H04L 12/935 | (2013.01) | |

(52) U.S. Cl.
CPC .......... *H04L 47/724* (2013.01); *H04L 49/109* (2013.01); *H04L 49/3018* (2013.01); *H04L 49/3027* (2013.01)

(58) Field of Classification Search
None
See application file for complete search history.

(56) References Cited

U.S. PATENT DOCUMENTS

| | | | |
|---|---|---|---|
| 8,284,766 B2 | 10/2012 | Anders et al. | |
| 2008/0205432 A1* | 8/2008 | Gangwal | H04L 45/40 370/458 |
| 2014/0119363 A1 | 5/2014 | Solihin | |
| 2015/0071282 A1 | 3/2015 | Anders et al. | |
| 2015/0188829 A1 | 7/2015 | Satpathy et al. | |
| 2015/0220470 A1 | 8/2015 | Chen et al. | |

FOREIGN PATENT DOCUMENTS

| | | |
|---|---|---|
| WO | WO 2014/209391 | 12/2014 |
| WO | 2016099795 A1 | 6/2016 |

OTHER PUBLICATIONS

Angelo Kuti Lusala et al., "A Hybrid NoC Combining SDM-TDM Based Circuit-switching with Packet-switching for Real-Time Applications", New Circuits and Systems Conference (NEWCAS), 2012 IEEE 10th International, Montreal, QC, Jun. 17-20, 2012, pp. 17-20.

(Continued)

*Primary Examiner* — Zewdu A Beyen
(74) *Attorney, Agent, or Firm* — Patent Capital Group

(57) ABSTRACT

An apparatus may comprise a plurality of ports and a plurality of channel reservation banks. A channel reservation bank is to be associated with a port of the plurality of ports. The channel reservation bank is to comprise a plurality of channel reservation slots. The port of the plurality of ports is to comprise a plurality of circuit-switched channels through the port. The configuration of each of the plurality of circuit-switched channels to be based on information stored in a channel reservation slot of the channel reservation bank to be associated with the port.

20 Claims, 9 Drawing Sheets

(56) References Cited

OTHER PUBLICATIONS

Faizal Arya Samman et al., "Wormhole Cut-Through Switching: Flit-Level Messages Interleaving for Virtual-Channelless Network-on-Chip", Microprocessors and Microsystems, Feb. 4, 2011, vol. 35, Issue 3, pp. 343-358.
International Search Report and Written Opinion in International Application No. PCT/US2015/061712 mailed on Feb. 25, 2016; 11 pages.
Sudhir N. Shelke et al., "Power & Area Efficient Router in 2-D Mesh Network-on-Chip Using Low Power Methodology—Clock Gating Techniques", International Journal of Hybrid Information Technology, Jul. 2012, vol. 5, No. 3, pp. 105-122.
Anders, et al., "A 2.9Tb/s 8W 64-Core Circuit-Switched Network-on-Chip in 45 nm CMOS," IEEE, 2008, 978-1-4244-2362-0/08 (pp. 182-185).
Anders et al., "A 4.1Tb/s Bisection-Bandwidth 560Gb/s/W Streaming Circuit-Switched 8×8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).
Chen et al., "A 340mV-to-0.9V 20.2Tb/s Source-Synchronous Hybrid Packet/Circuit-Switched 16×16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

\* cited by examiner

SPATIALLY DIVIDED CIRCUIT-SWITCHED CHANNELS FOR A NETWORK-ON-CHIP

FIELD

The present disclosure relates in general to the field of computer development, and more specifically, to spatially divided circuit-switched channels for a network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. Hybrid packet/circuit-switched NoCs enable high throughput and utilization of packet-switching with energy efficiency approaching circuit-switched data propagation.

BRIEF DESCRIPTION OF THE DRAWINGS

Like reference numbers and designations in the various drawings indicate like elements.

DETAILED DESCRIPTION

Figure 1:
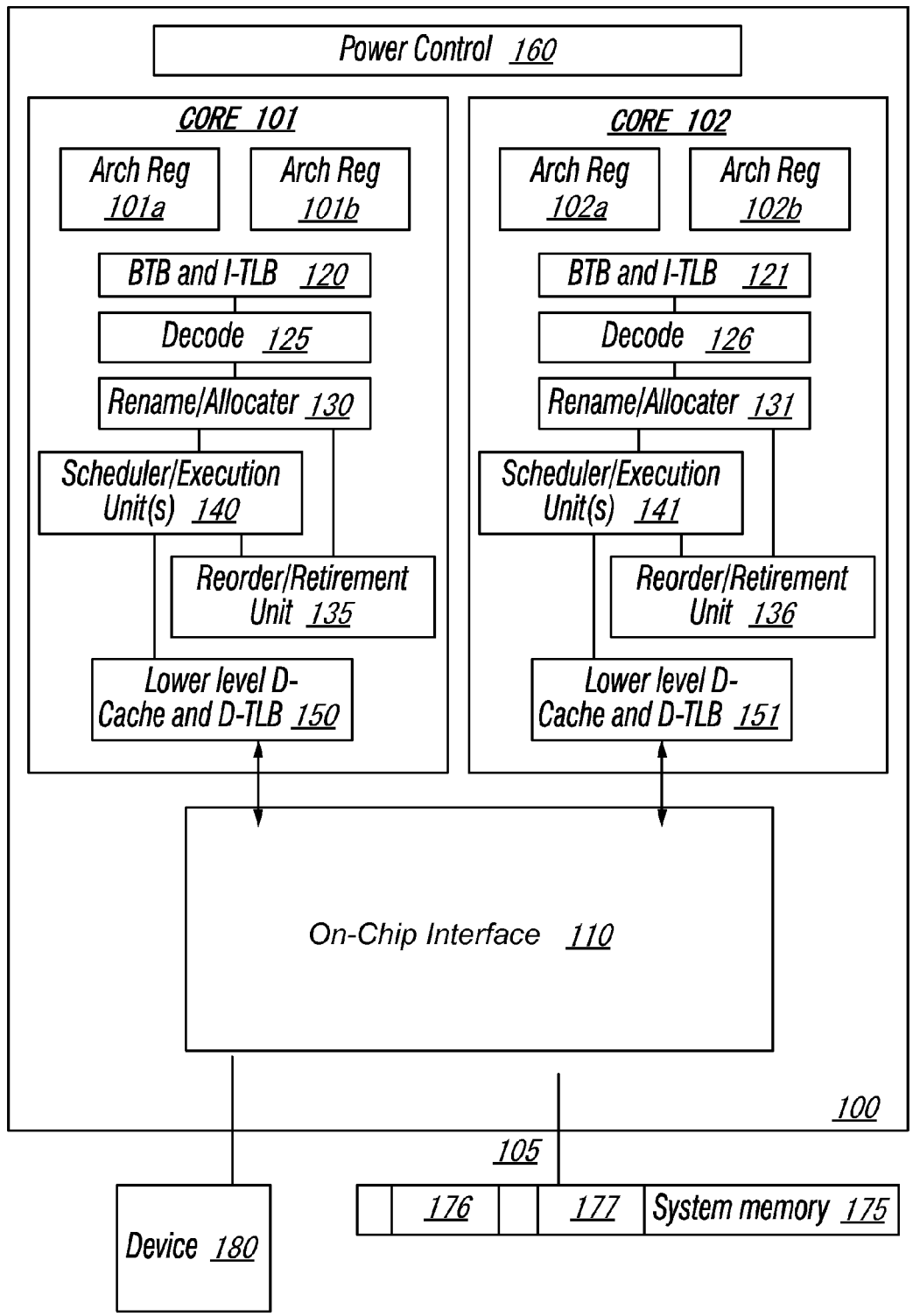
FIG. 1 illustrates a block diagram for an example computing system including a multicore processor in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
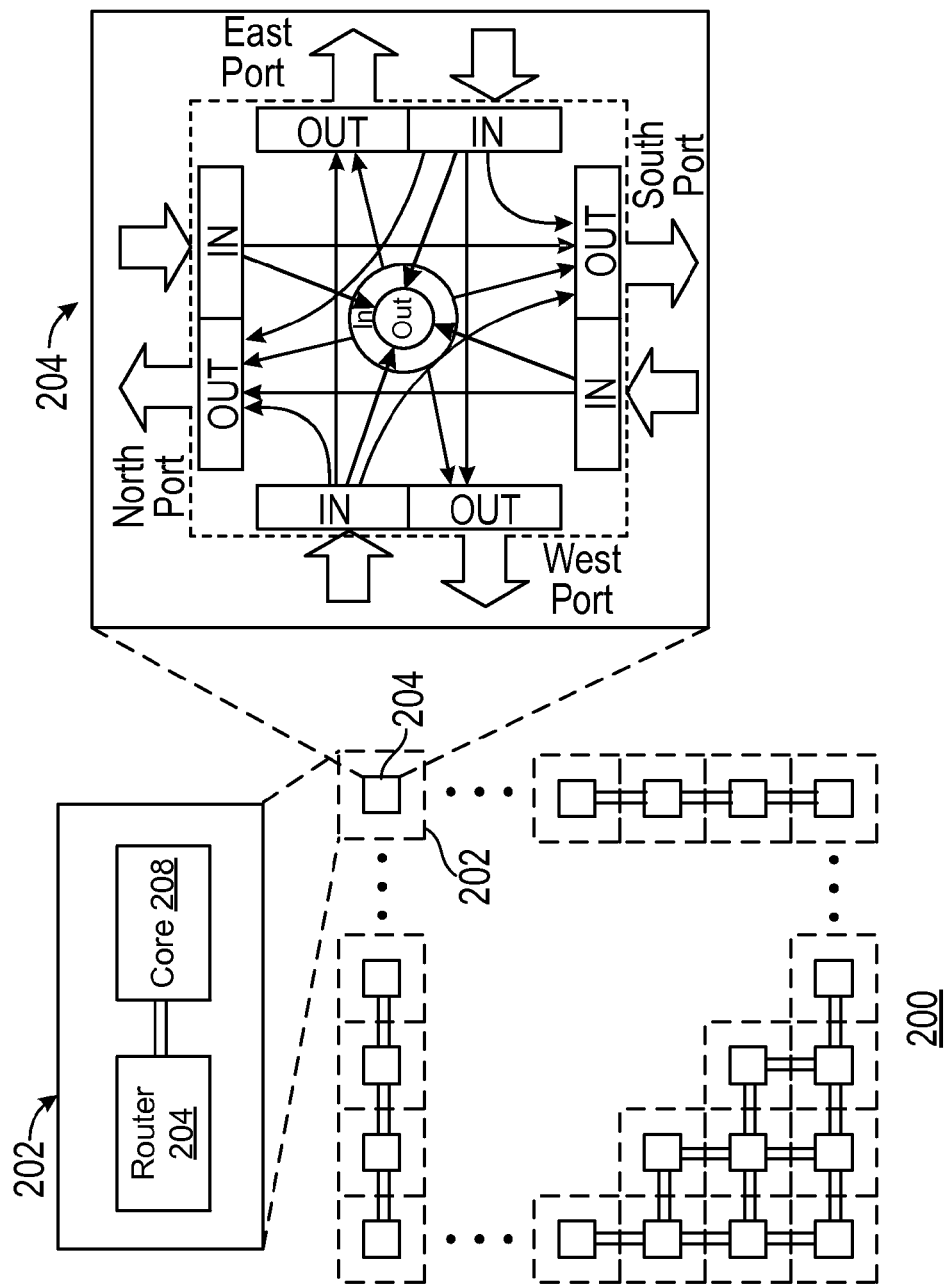
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. The packets may be received, transmitted and processed by the routers 204. The packet switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

In some hybrid packet/circuit-switched network implementations, circuit-switched channel requests are queued with priority based on arrival time and only the highest priority request at each router controls the circuit-switched channel. Such implementations can result in under-utilization of circuit-switched wiring resources since other queued requests in the NoC that are shorter or go through less congested regions could have been completed while the channel is setup or blocked by the top priority requests. Various embodiments of the present disclosure (which will be described in greater detail below) include a spatially divided hybrid packet/circuit-switched NoC that enables increased flexibility for more optimal data routing and higher throughput by splitting the circuit-switched wiring resources into multiple smaller channels. Channel reservations are not placed in a request queue but in a channel reservation bank where each slot of the bank independently controls a smaller width of the circuit-switched channel. Similar circuit techniques can also be used to incorporate multiple circuit-switched networks using more wiring resources while using a shared packet-switched request to setup the channels in the separate networks.

Figure 3:
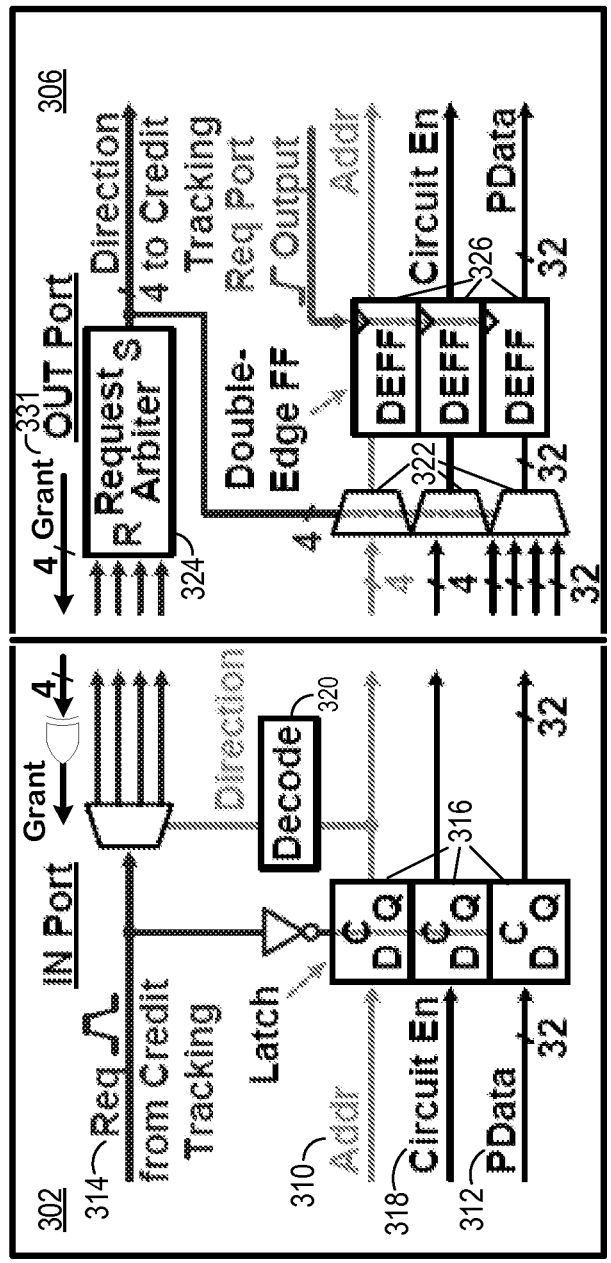
FIG. 3 illustrates example input (IN) and output (OUT) ports of a packet-switched portion of a router of a source-synchronous hybrid packet/circuit-switched NoC in accordance with certain embodiments.

FIG. 3 illustrates example IN and OUT ports of a packet-switched portion of a router of a source-synchronous hybrid packet/circuit-switched NoC in accordance with certain embodiments. The embodiment depicted assumes a router with five port sets (each port set being logically subdivided into an IN port and an OUT port), though any number of port sets may be used in other embodiments. Block 302 represents a packet-switched portion of an IN port and block 306 represents a packet-switched portion of an OUT port.

A request packet may enter the IN port through block 302. In a hybrid source-synchronous NoC implementation, request packets establish circuit-switched channels between source logic located at a network element 202 and destination logic located at a different network element. To begin a data transfer, the source logic sends a reservation packet toward the destination logic. This reservation packet may be communicated via a packet-switched portion of the NoC and may reserve resources for circuit-switched data communication between source logic and destination logic as the reservation packet travels from the source to the destination.

The reservation packet may include any suitable information facilitating the reservation of a circuit-switched channel. As an example, the reservation packet may include an address 310 (i.e., the address associated with the destination) and optional sideband packet data 312. The packet is forwarded downstream based on the address 310 when resources are available. For example, based on a deterministic routing method (e.g., X-first, Y-second routing or a table lookup) or other routing protocol performed by direction decoder 320 in the given router, the reservation packet is forwarded along on a path from the source logic to the destination logic. In an embodiment, a unique address may be associated with each core 208 or other logic block (and thus router 204 in cases where there is a 1:1 mapping between cores and routers). In turn, this local address may be used to generate direction information local to each router to identify the appropriate port of the router for sending the information. Thus, the address 310 may be used in conjunction with the local address of the router 204 to determine which direction to forward an incoming packet. Circuit enable signal 318 is used to determine whether the incoming packet is reserving a circuit-switched path. If the circuit enable signal 318 is not asserted, no circuit-switched path is set up, and the packet merely carries the sideband packet data 312.

Router 204 may use a credit system to allow multiple requests to be sent from one port before the first request is serviced. As an example, an OUT port may operate in accordance with a credit-2 packet system, wherein the number of sent requests from the OUT port can exceed the number of received grants by two, while an IN port may operate in accordance with a credit-1 packet system, wherein the IN port may not send additional requests until a grant is received. However, any suitable credit system may be used at either port. The ports may include credit tracking logic to generate request signals 314 (each request signal corresponding to a reservation packet) and grant signals 331 and to track the number of requests that have been granted. In various embodiments, requests and grants are transition encoded. At the IN port, a request may be converted to a level-sensitive signal, demuxed using address 310, and sent to the correct OUT port. If resources are not available, the incoming packet may be blocked. If resources are available to service the packet, latches 316 receive the address 310, packet data 312, and circuit enable signal 318. These signals are then provided to each OUT port (other than the OUT port of the port set from which they were received). The correct OUT port will process the packet when resources are available.

When a given input port is open, the incoming address 310, packet data 312, and circuit enable signal 318 are passed through latches 310 to multiplexers 322 of the appropriate OUT port. Multiplexers 322 may receive similar signals from each other input port of router 204. Request arbiter 324 chooses a request to service from the requests received from the IN ports. The output of request arbiter 324 may drive credit tracking logic in the OUT port to output a grant signal 331 to be sent to the appropriate IN port when a request from the IN port is selected by request arbiter 324. The output of request arbiter 324 is also used to select the outputs of multiplexers 322 which are then coupled to double edge triggered flip flops 326.

Figure 4C:
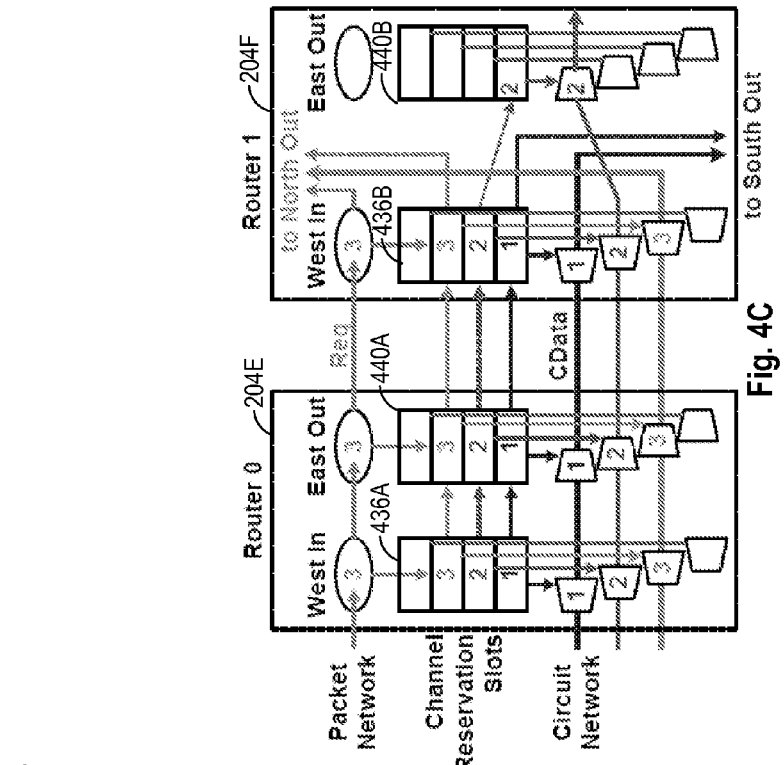
FIGS. 4A-4C illustrate example circuit-switched channel reservation techniques in accordance with certain embodiments.
Figure 4A:
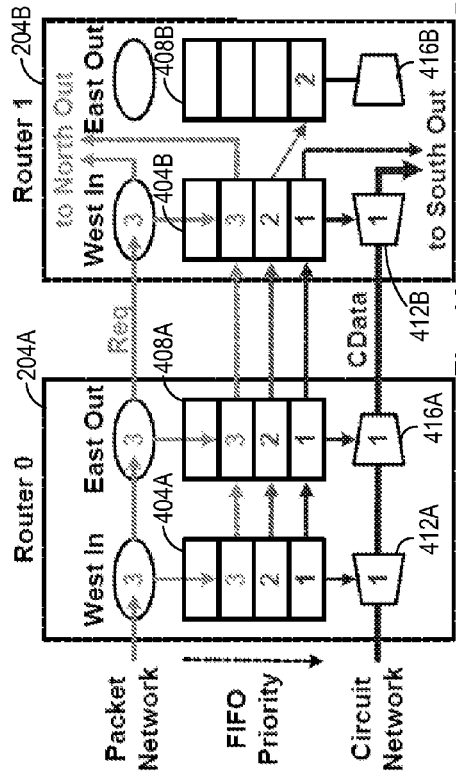
Figure 4B:
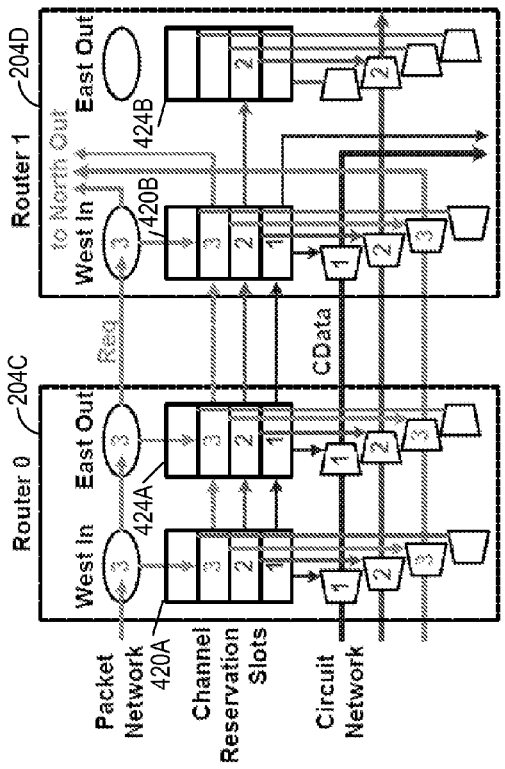
Figure 5A:
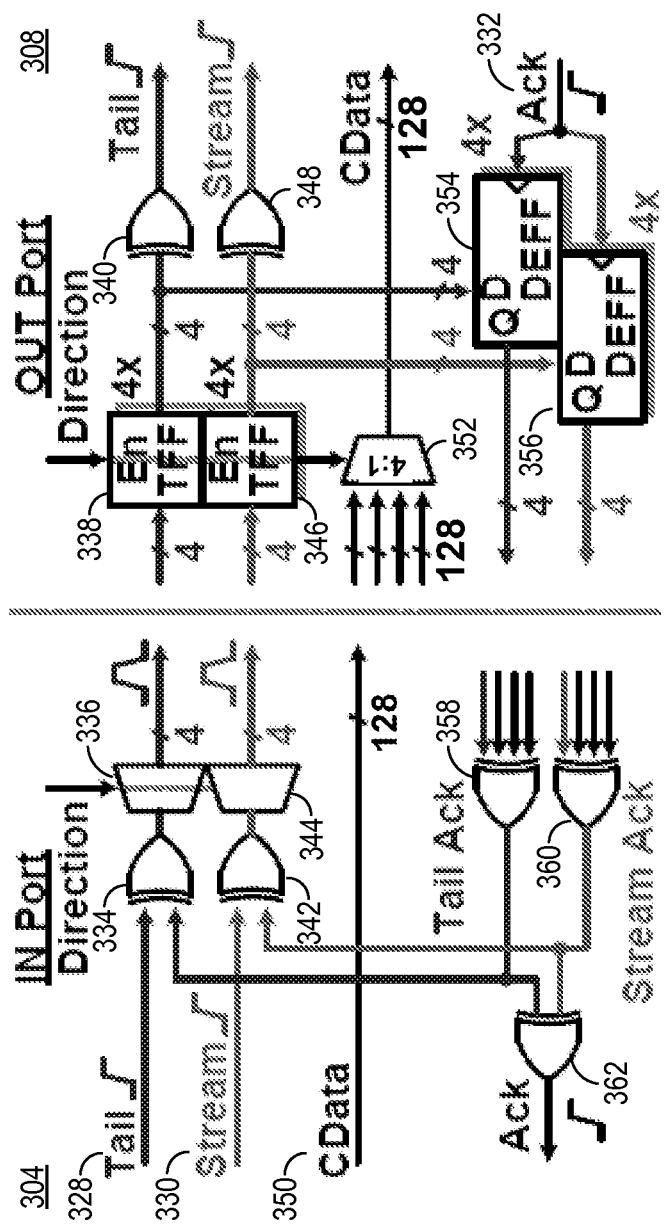
FIGS. 5A-5C illustrate example IN and OUT ports of a circuit-switched portion of a router of a source-synchronous hybrid packet/circuit-switched NoC in accordance with certain embodiments.
Figure 5B:
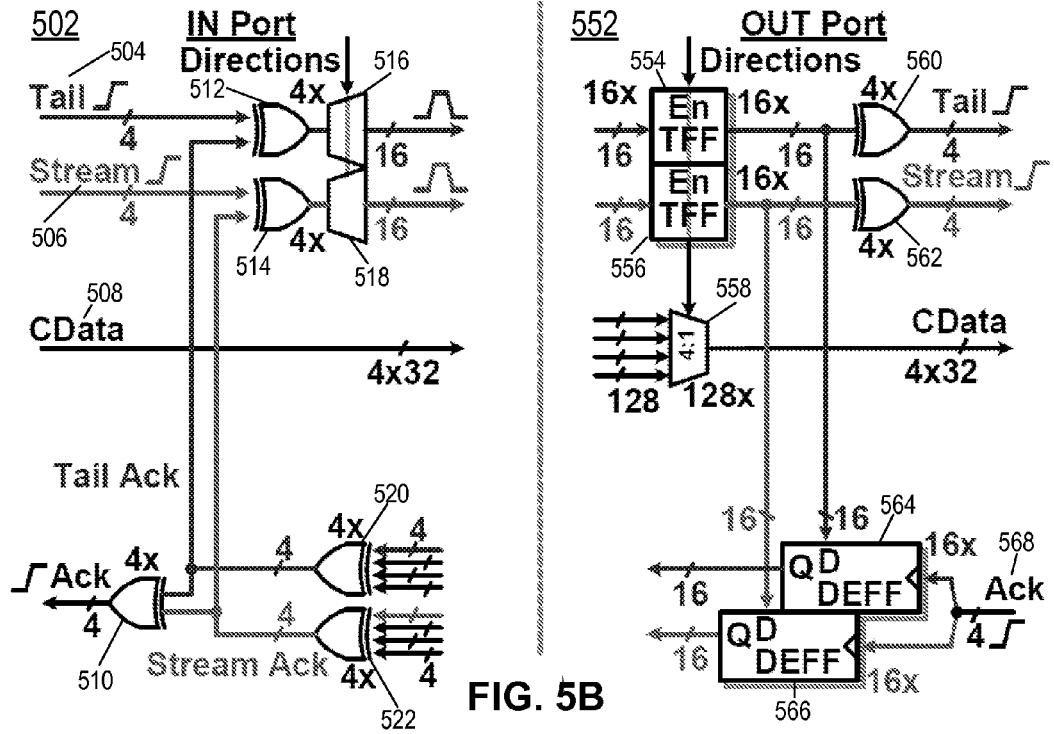
Figure 5C:
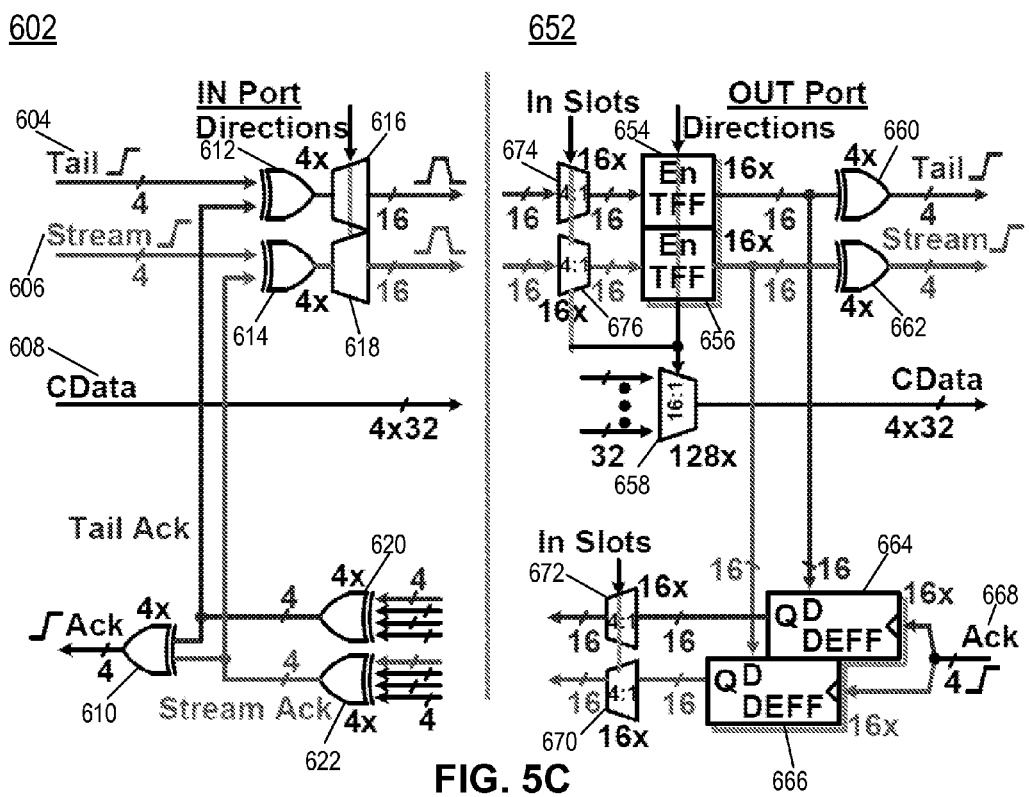

FIGS. 4A-4C illustrate example circuit-switched channel reservation techniques in accordance with certain embodiments. FIG. 4A illustrates a reservation technique in which circuit-switched channel requests are queued with priority based on arrival time and only the highest priority request at each router controls the circuit-switched channel. FIGS. 4B and 4C illustrate reservation techniques in which channel reservations are not placed in a request queue but in channel reservation slots that each independently control a distinct portion of the circuit-switched channel (in other words each channel reservation slot controls a distinct circuit-switched channel that is smaller than the circuit-switched channel of FIG. 4A). FIGS. 5A-5C illustrate example IN and OUT ports of a circuit-switched portion of a router of a source-synchronous hybrid packet/circuit-switched NoC in accordance with certain embodiments. These embodiments each assume routers with five port sets, though any suitable number of port sets may be use. FIG. 5A corresponds with the technique shown in FIG. 4A, FIG. 5B corresponds with the technique shown in FIG. 4B, and FIG. 5C corresponds with the technique shown in FIG. 4C. Each technique and its corresponding example ports will be described in turn.

FIG. 4A depicts a circuit-switched channel reservation technique in which a single circuit-switched channel is controlled by the highest priority slot of priority FIFOs 404 and 408. In the embodiment depicted, the particular reservation requests shown are received at an IN port of router 204A and sent to the appropriate OUT port (in this case the east OUT port). They are then sent to an IN port of router 204B and the appropriate OUT port of router 204B. Path information associated with each reservation request is stored in priority FIFOs 404 and 408 as the reservation traverses through routers 204A and 204B as it travels from source to destination in the NoC. If a reservation does not have a highest priority on the path (i.e., is not in the highest priority slot of each associated priority FIFO) from the source logic to the destination logic, the reservation is delayed until it is the highest priority.

In the embodiment depicted, reservations are represented by numerals 1, 2, and 3 for illustrative purposes, though in particular embodiments, the priority FIFOs 404 and 408 may include any suitable information, such as a direction associated with the request. In an embodiment, direction information from the output of direction decoder 320 (e.g., two bits to identify one of four directions) is stored into slots of the priority FIFO 404 if the circuit enable signal 318 is asserted. Thus, in priority FIFOs 404 of IN ports, the direction stored in a FIFO slot may indicate the OUT port that is associated with the reservation. In an embodiment, direction information from the output of request arbiter 324 (e.g., two bits to identify one of four directions) is stored into slots of the priority FIFO 408 if the circuit enable signal 318 is asserted. Thus, in priority FIFOs 408 of OUT ports, the direction stored in a FIFO slot may indicate the IN port associated with the reservation.

The highest overall priority FIFO slots across the FIFOs 404 and 408 control various demultiplexers 412 and multiplexers 416 to establish a path for the circuit-switched control signals and data. In FIGS. 4A-4C, the demultiplexers 412 and multiplexers 416 shown near the bottom of each figure may correspond to one or more actual demultiplexers and multiplexers (or similar logic) that operate on various signals used to implement the circuit-switched channels and thus may be viewed as abstractions of the actual circuit implementations. For example, the highest priority direction stored in priority FIFO 404A is used to control demultiplexers 336 and 344 (referring now to FIG. 5A) to pass control signals while the highest priority direction stored in priority FIFO 408A is used to control multiplexer 352 to pass circuit-switched data signals and toggle flip-flops 338 and 346 to pass control signals during circuit-switched communication (double edge flip flops 354 and 356 may also effectively function as a demultiplexer).

The reservation packets sent via the packet-switched portions of the routers 204A and 204B are used to establish a circuit-switched channel using the circuit-switched portions 304 and 308 of the router. The circuit data 350 is broadcast from the IN port to each OUT port and is selected via multiplexers 352 (which may be a multiplexer latch or other suitable logic). A latch may be used for the circuit data to prevent unnecessary glitches on the data link. In an embodiment, the latch remains open during a circuit transfer and switches only once per stream, for significantly lower clock power than packet switching.

Various elements for circuit-switched communication are controlled via control signals tail 328, stream 330, and acknowledgement 332 ("ack"). In an embodiment, two forward control signals are implemented (stream 330 and tail 328) that both designate a data transfer. The stream signal 330 indicates communication of circuit data with more data to follow (as additional segments) and thus keeps the circuit channel open for a complete circuit data transfer (of one or more segments) and the tail signal 328 indicates an end of a circuit data transfer. In the opposite direction, a reverse control signal ack 332 is sent from destination to source for each segment of the circuit data transfer. The tail signal is provided to XOR gate 334, demultiplexer 336, and consequently toggle flip-flop 338 and XOR gate 340 of an OUT port. The stream signal 330 is provided (via an exclusive-OR gate 342) and through a demultiplexer 344 (for the stream signal) and to toggle flip-flop 346 of an OUT port and XOR gate 348. The ack signal 332 may be used to produce a tail ack signal through double edge flip flop 354 and XOR gate 358 and a stream ack signal through double edge flip flop 356 and XOR gate 360. These ack signals are converted back into a single ack signal through XOR gate 362. While the channel is held open, circuit data can be streamed to send multiple data segments (e.g., each of 128$b$ of data), with each segment having its own ack signal 332. This amortizes circuit-switched arbitration overhead over much larger data transfers. When data streaming is complete, the final acknowledge signal 332 de-allocates the channel by incrementing the priority in all priority FIFOs along the path. This removes the completed highest-priority reservation from the FIFO, allowing subsequent circuit-switched transfers to occur. Thus, in the embodiments depicted in FIGS. 4A and 5A, only a single circuit-switched channel is implemented by each port. Accordingly, reservations 2 and 3 of FIG. 4A must wait until reservation 1 is complete before being allowed to transfer data. Granting access to the entire width of the circuit-switched channel (complete or incomplete) to only the top priority requests in the FIFOs can lead to under-utilization since other queued requests in the NoC that are shorter or go through less congested regions could have been completed while the channel is setup or blocked by the top priority requests.

FIGS. 4B and 5B illustrate embodiments in which the circuit-switched channel width is split to enable independent control by the corresponding request in each reservation slot. Instead of a priority FIFO, routers 204C and 204D include channel reservation slot banks 420 and 424. Slot banks may hold any suitable number of slots for channel reservations. In the depicted embodiment, slot banks can hold data for four reservations. Slot banks 420 and 424 may hold direction data similar to that described above with respect to the priority FIFOs. Different slots of a bank 420 or 424 control different circuit-switched channels. For example, in the embodiment depicted, reservations 1, 2, and 3 are each in different slots and each controls a distinct circuit-switched channel. Independent control by the channel reservation slots enables multiple simultaneous circuit-switched channel setup and data transfers through each port of every router.

In the embodiment depicted, the reservation slot position of each reservation request is constrained to be uniform. That is, if direction information from reservation 1 occupies a last slot of bank 420A then other direction information from reservation 1 should also occupy the last slots of other banks 420 and 424 of ports that lie in the path from source to destination. In such embodiments, additional wires (e.g., two extra wires for four slot banks) may be included to transmit the fixed slot number along with the request in the packet-switched network. In such embodiments, a request packet may be blocked when the requested slot is occupied. Such embodiments may utilize smaller and less overall multiplexers or other logic and avoid slot mapping storage that may be utilized when a reservation is allowed to store data in different slot positions.

Referring to FIG. 5B, the IN port includes four different lines to carry tail signals 504 and four different lines to carry stream signals 506, with each line dedicated to one of four circuit-switched channels that may be setup by the IN port. The tail signals 504 pass through XOR gates 512 (along with corresponding ack signals) and demultiplexers 516 (which are controlled by the various channel reservation slots of the IN port) and the resulting signals are coupled to each OUT port (i.e., each OUT port receives four signals, where each of the signals corresponds to a different circuit-switched channel) other than the OUT port of port set including the IN port. Similarly, the stream signals 506 pass through XOR gates 514 (along with corresponding ack signals) and demultiplexers 518 (which are controlled by the various channel reservation slots of the IN port) and are coupled to each OUT port. At the OUT port a set of four tail signals and a set of four stream signals are received from each port and passed respectively to toggle flip flops 554 and 556 which are controlled by the various channel reservation slots of the OUT port. The resulting signals pass through XOR gates 560 and 562 respectively and are sent towards the destination by the OUT port.

In the OUT port, four different lines carry ack signals 568, with each line dedicated to one of four circuit-switched channels that may be setup by the OUT port. The ack signals 568 pass through double edge flip flops 564 and 566 (which are respectively controlled by the tail signals and the stream signals) and then coupled back to the input ports (each input port receives four tail ack signals and four stream ack signals from each output port, each of these signals corresponding to a possible circuit-switched channel that may be formed between the IN port and the respective OUT port). The ack signals received from the various output ports pass through XOR gates 520, 522, and 510 back at the IN port before the resulting ack signals are sent back towards the source.

Four different sets of 32-bit circuit data 508 is received by the IN port and each of these data lines is coupled to every OUT port (other than the OUT port of the port set that includes the IN port). Each OUT port receives four sets of 32 bits of circuit data from each IN port (128 bits total from each IN port). This data is passed through a set of multiplexers 558. Each multiplexer 558 uses direction information from a channel reservation slot of the slot bank 424 to select from its input data. The output of the multiplexers is four sets of 32 bits each, each set representing a distinct circuit-switched channel.

FIGS. 4C and 5C illustrate additional embodiments in which the circuit-switched channel width is split to enable independent control by the corresponding request in each reservation slot. Unlike the embodiments shown in FIGS. 4B and 5B, these embodiments allow for information from a reservation to occupy different slot positions in channel reservation banks 436 and 440.

Routers 204E and 204F include channel reservation slot banks 436 and 440, which may have any suitable characteristics described above with respect to banks 420 and 424. Different slots of a bank 436 or 440 control different circuit-switched channels. For example, in the embodiment depicted, reservations 1, 2, and 3 are each in different slots of bank 436A and each controls a distinct circuit-switched channel. Independent control by the channel reservation slots enables multiple simultaneous circuit-switched channel setup and data transfers through each port of every router.

In the embodiment depicted, the reservation slot position of each reservation request need not be uniform. For example, although the slots are consistent for reservations 1, 2, and 3 in slot banks 436A, 440A, and 436B, slot bank 440B has information from reservation 2 in a slot (the last slot) that is not in the same slot position as the other information from reservation 2 which is stored in the next-to-last slot in the other banks. Accordingly, circuit-switched requests entering a router on a reservation slot in an input port can exit the router on any free slot at the output port to enable maximum utilization of slots and NoC wiring resources. In such embodiments, the requested slot position does not need to be forwarded with each reservation packet. Instead, in addition to storing direction information for reservation requests, slot banks 440 of the OUT ports may also store a mapping between each slot and the associated slot in the IN port slot bank 436 (in some embodiments, the mapping is expressed as the slot number of the corresponding slot at the IN port). This mapping may be used to control selection logic in the OUT port as will be described below. In embodiments where the slot positions do not need to be uniform, a request packet may be blocked when each slot of the corresponding slot bank is full.

Referring to FIG. 5C, the IN port 602 may be implemented in a similar manner to the IN port 502 depicted in FIG. 5B. The OUT port may include additional logic to account for non-uniform slot positions. At the OUT port, a set of four tail signals and a set of four stream signals are received from each IN port and passed to respective sets of sixteen 4:1 multiplexers 674 and 676. Multiplexers 674 and 676 each receive an indication of the slot mapping between the OUT reservation slots and the corresponding IN reservations slots and rearrange (if needed) the tail and stream signals to ensure alignment between signals associated with the same reservation. The output of the multiplexers is passed to sets of toggle flip flops 654 and 656 which are controlled by the direction information of the various channel reservation slots of the OUT port. The resulting signals pass through XOR gates 660 and 662 respectively and are sent towards the destination by the OUT port.

The OUT port also includes four different lines carrying ack signals 668, with each line dedicated to one of four circuit-switched channels that may be setup by the OUT port. The ack signals 668 pass through double edge flip flops 664 and 666 (which are respectively controlled by the tail signals and the stream signals) and 4:1 multiplexers 670 and 672 (which each include sixteen multiplexers). Multiplexers 670 and 672 each receive an indication of the slot mapping between the OUT reservation slots and the IN reservations slots and rearrange (if needed) the ack signals to ensure alignment between signals associated with the same reservation. The ack signals are then coupled back to the IN ports (each IN port receives four tail ack signals and four stream ack signals from each output port, each of these signals corresponding to a possible circuit-switched channel that may be formed between the IN port and the respective OUT port). The ack signals received from the various output ports pass through XOR gates 620, 622, and 610 back at the IN port before the resulting ack signals are sent back towards the source.

Four different sets of 32-bit circuit data 608 are received by the IN port and each of these data lines is coupled to every OUT port. Each OUT port receives four sets of 32 bits of circuit data from each IN port (128 bits total from each IN port) other than the IN port of the port set that includes the OUT port. This data is passed through a set of 16:1 multiplexers 658. Multiplexers 658 each select data based not only on input port direction but also on the mapping between the OUT port reservation slot and the corresponding IN port reservation slot, and thus a set of 16:1 multiplexers are used, rather than the 4:1 multiplexers used in the embodiment described previously where the slot positions remain consistent. The output of the multiplexers is four sets of 32 bits each, each set representing a distinct circuit-switched channel.

Various embodiments above illustrate embodiments that may be used to enable multiple hybrid packet/circuit-switched data transmission channels via a single channel reservation queue in the context of source-synchronous NoCs. In source-synchronous NoCs, control signal transitions (e.g., the stream and tail signals) forwarded along with the data act as clock signals, thus eliminating the need for a fully-synchronous clock. This technique facilitates multi-clock designs (wherein cores associated with different routers may operate at different frequencies) by removing the need for synchronizing FIFOs at each router. However, the illustrated embodiments can be easily adapted to work with fully-synchronous NoCs with explicit clocks and level sensitive control signals. A synchronous packet-switched NoC may comprise routers that communicate with their neighbors based on a global clock. Thus, all the routers in a synchronous NoC operate at the same frequency. In various synchronous implementations, no explicit credit tracking circuits are required since the placement of flip-flops and latches along with grant and request based clock-gating of storage elements may achieve the same result. The clock for the circuit-switched network may be derived from the clock for the packet-switched network and may be a multiple of the clock of the packet-switched network to account for the worst-case circuit-switched channel setup.

Figure 6:
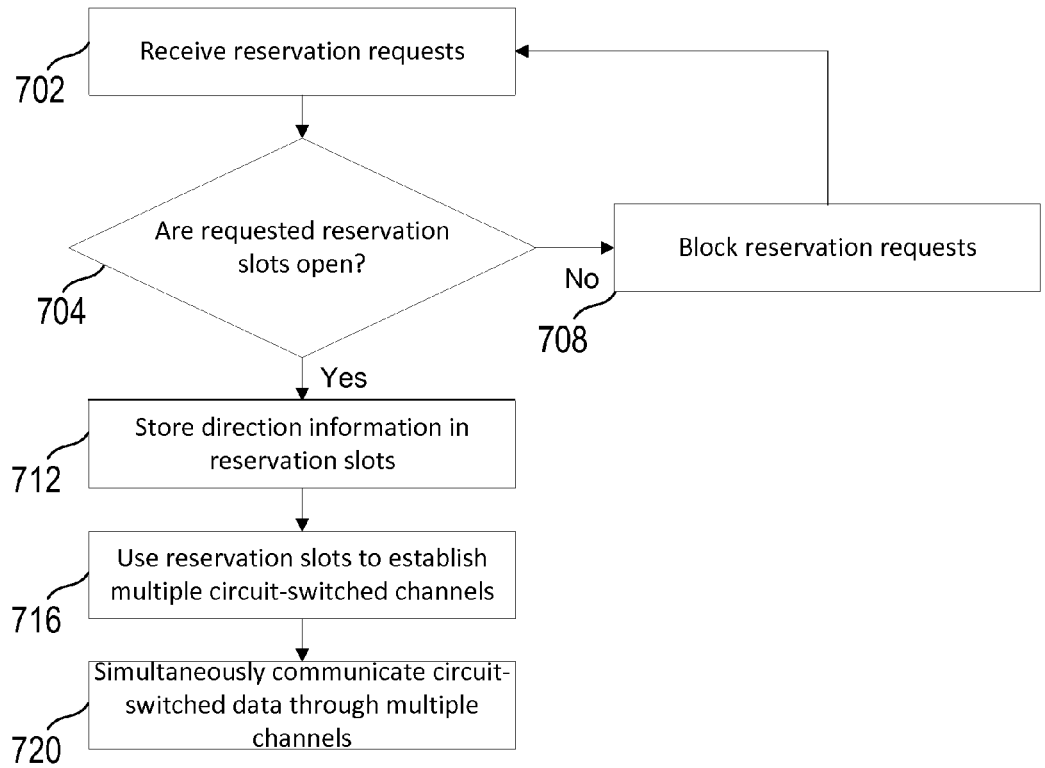
FIG. 6 illustrates an example method for communicating via multiple circuit-switched channels using uniform channel reservation slots in accordance with certain embodiments.

FIG. 6 illustrates an example method 700 for communicating via multiple circuit-switched channels using uniform channel reservation slots. The steps of method 700 may be performed by a port of a router. At step 702, reservation requests are received. These reservation requests may each include a reservation packet communicated via a packet-switched portion of the NoC. Each reservation packet may include an address (and optional packet data) of the destination logic. The reservation request may also include an indication of a reservation slot position. At step 704, for each reservation request received, a slot bank is checked to determine whether a slot position identified in the reservation request is available. If the identified slot position is not available, the reservation request is blocked at step 708. If the identified slot position is available, direction information associated with the request is stored in the identified slot position at step 712. For example, if the port is an IN port, the direction information may identify an OUT port (of the same router as the IN port) that the reservation should go through. As another example, if the port is an OUT port, the direction information may identify an IN port (of the same router as the OUT port) that the reservation should go through.

At step 716, the reservation slots are used to establish multiple circuit-switched channels. As an example, each reservation slot may be used to establish a distinct circuit-switched channel. The circuit-switched channels may have different sources and/or destinations. The circuit-switched channels are not necessarily established at the same time, but a channel may be active while one or more other channels through the same port is active. In order to establish a circuit-switched channel, appropriate control signals (e.g., the direction information stored in the reservation slots) may be sent to control various demultiplexers (e.g., to pass handshaking signals) and multiplexers (e.g., to pass circuit data) at each router along the path from the source logic to the destination logic. After establishment of the circuit-switched channels, data communication between the respective source logic and destination logic occurs over those circuit-switched channels at step 720. Transfers in two or more different circuit-switched channels may occur simultaneously. Each transfer may include one or more segments of data, whose size is set by the data bus. In an embodiment with circuit streaming, multiple segments can be communicated in each from the respective source logic to the destination logic before the channel is closed. As explained above, in one embodiment, communication is performed using two-phase handshaking with forward (stream, tail) and reverse (ack) handshaking signals sent over dedicated channels from the core to each other port. For each circuit-switched channel, when the last ack signal is received, the circuit-switched channel is closed.

Some of the steps illustrated in FIG. 6 may be combined, modified or deleted where appropriate, and additional steps may also be added to the flowchart. Additionally, steps may be performed in any suitable order without departing from the scope of particular embodiments.

Figure 7:
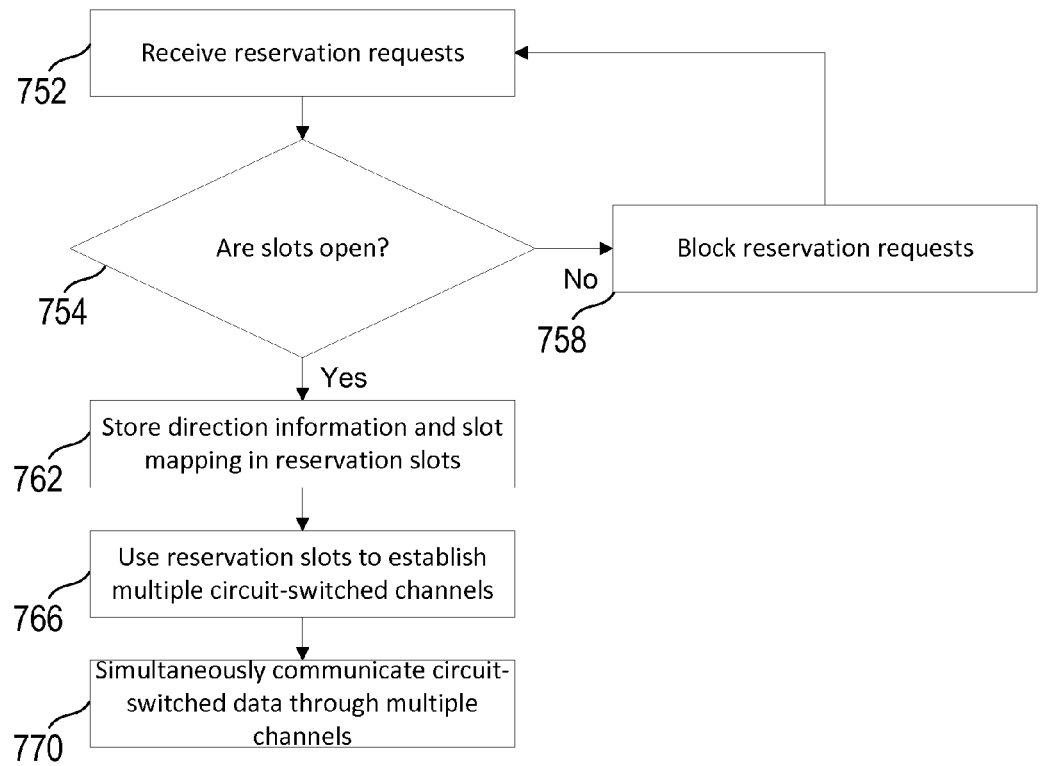
FIG. 7 illustrates an example method for communicating via multiple circuit-switched channels using non-uniform channel reservation slots in accordance with certain embodiments.

FIG. 7 illustrates an example method 750 for communicating via multiple circuit-switched channels using non-uniform channel reservation slots. The steps of method 750 may be performed by a port of a router. At step 752, reservation requests are received. At step 754, for each reservation request received, a slot bank is checked to determine whether any slot positions are available to store information associated with the reservation request. If no slot positions are available, the reservation request is blocked at step 758. If a slot position is available, direction information associated with the request and (if the port is an OUT port) a mapping between the slot position and a corresponding slot position at the IN port (of the same router) is stored at step 762. At step 766, the reservation slots are used to establish multiple circuit-switched channels. If the port is an OUT port, both the direction information and the slot mapping information in a particular slot may be used to control logic to select the appropriate signals for a circuit-switched channel. Each reservation slot may be used to establish a distinct circuit-switched channel. After establishment of the circuit-switched channels, data communication between the respective source logic and destination logic occurs over those circuit-switched channels at step 770.

Any of the steps illustrated in FIG. 7 may be performed in a manner similar to corresponding steps described with respect to FIG. 6. Some of the steps illustrated in FIG. 7 may be combined, modified or deleted where appropriate, and additional steps may also be added to the flowchart. Additionally, steps may be performed in any suitable order without departing from the scope of particular embodiments.

Figure 8:
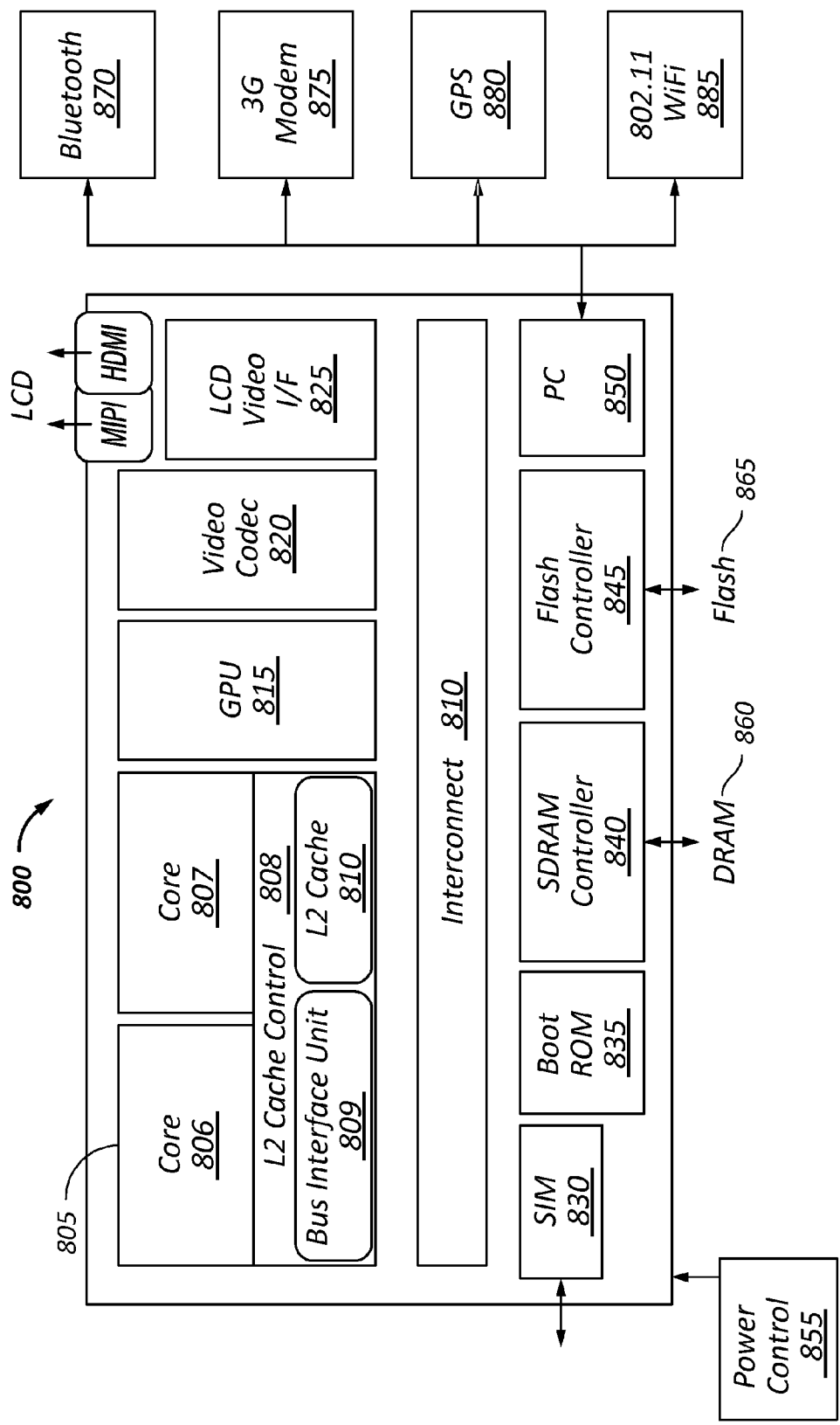
FIG. 8 illustrates another block diagram for an example computing system in accordance with certain embodiments.

FIG. 8 illustrates another embodiment of a block diagram for an example computing system in accordance with one embodiment. In this figure, an embodiment of a system on-chip (SOC) design in accordance with the disclosures is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described disclosure.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control Q1650 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system illustrates peripherals for communication, such as a Bluetooth module 870, 3G modem 875, GPS 885, and WiFi 885. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic, and a method wherein a router of a network-on-chip is to comprise a first channel reservation bank. The first channel reservation bank is to comprise a plurality of channel reservation slots. The router is to receive first and second channel reservation requests via a packet-switched network, store information associated with the first channel reservation request in a first slot of the first channel reservation bank, store information associated with the second channel reservation request in a second slot of the first channel reservation bank, establish at least a portion of a first circuit-switched channel based on the information stored in the first slot of the first channel reservation bank, and establish at least a portion of a second circuit-switched channel based on the information stored in the second slot of the first channel reservation bank.

In at least one example, the apparatus is a processor.

In at least one example, the router is further to simultaneously transfer first circuit-switched data via the first circuit-switched channel and second circuit-switched data via the second circuit-switched channel.

In at least one example, the first channel reservation bank is associated with an input port of the router.

In at least one example, the first channel reservation bank is associated with an output port of the router.

In at least one example, each channel reservation slot of the first channel reservation bank is associated with a distinct circuit-switched channel and is to provide direction information associated with a channel reservation request to facilitate establishment of the respective circuit-switched channel.

In at least one example, the router is further to receive a third channel reservation request that is to comprise an indication of a channel reservation slot.

In at least one example, the router is further to block the third channel reservation request upon a determination that the channel reservation slot indicated by the third channel reservation request is not available in the first channel reservation bank.

In at least one example, the router is further to block a third channel reservation request upon a determination that each channel reservation slot of the first channel reservation bank is occupied.

In at least one example, the router is further to comprise a plurality of ports, each port to comprise a respective channel reservation bank, each channel reservation bank to comprise a plurality of channel reservation slots, each channel reservation slot to provide information associated with a channel reservation request to establish a circuit-switched channel.

One or more embodiments may provide an apparatus, a system, a machine readable storage, a machine readable medium, hardware- and/or software-based logic comprising a plurality of ports and a plurality of channel reservation banks. A channel reservation bank is to be associated with a port of the plurality of ports and the channel reservation bank is to comprise a plurality of channel reservation slots. The port of the plurality of ports is to comprise a plurality of circuit-switched channels through the port. The configuration of each of the plurality of circuit-switched channels is to be based on information stored in a channel reservation slot of the channel reservation bank to be associated with the port.

In at least one example, the port of the plurality of ports is to comprise a plurality of simultaneous circuit-switched channels through the port, each circuit-switched channel configured based on information stored in a channel reservation slot of the channel reservation bank to be associated with the port.

In at least one example, a channel reservation slot is to store direction information associated with a circuit-switched channel reservation.

In at least one example, first information associated with a circuit-switched channel reservation is to be stored in a first channel reservation slot of a first channel reservation bank of the plurality of channel reservation banks and second information associated with the circuit-switched channel reservation is stored in a second channel reservation slot of a second channel reservation bank of the plurality of channel reservation banks.

In at least one example, the first channel reservation slot has a position within the first channel reservation bank that is the same as the position of the second channel reservation within the second channel reservation bank.

In at least one example, the first channel reservation slot has a position within the first channel reservation bank that is different from the position of the second channel reservation within the second channel reservation bank.

One or more embodiments may provide an apparatus, a system, a machine readable storage, a machine readable medium, hardware- and/or software-based logic, a method, and a non-transitory machine readable medium including information to represent structures, when manufactured, to be configured to receive first and second channel reservation requests via a packet-switched network, store information associated with the first channel reservation request in a first slot of the first channel reservation bank, store information associated with the second channel reservation request in a second slot of the first channel reservation bank, establish at least a portion of a first circuit-switched channel based on the information stored in the first slot of the first channel reservation bank; and establish at least a portion of a second circuit-switched channel based on the information stored in the second slot of the first channel reservation bank.

In at least one example, first circuit-switched data is simultaneously transferred via the first circuit-switched channel and second circuit-switched data via the second circuit-switched channel.

In at least one example, additional information associated with the first channel reservation request is stored in a slot of a third channel reservation bank and a mapping between the slot of the third channel reservation bank and the first slot of the first channel reservation bank is stored.

In at least one example, another portion of the first circuit-switched channel is established based on the additional information stored in the third channel reservation bank and the mapping.

One or more embodiments may provide an apparatus, a system, a machine readable storage, a machine readable medium, hardware- and/or software-based logic to comprise a plurality of cores each associated with a router of a network on a chip. Each of the routers to comprise a plurality of ports, a plurality of channel reservation banks, each channel reservation bank to be associated with a port of the plurality of ports, each channel reservation bank to comprise a plurality of channel reservation slots. A port of the plurality of ports is to comprise a plurality of circuit-switched channels through the port, the configuration of each of the plurality of circuit-switched channels to be based on information stored in a channel reservation slot of the channel reservation bank associated with the port.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor to comprise:
a router of a network-on-chip, the router to comprise a first channel reservation bank associated with an input port of a plurality of input ports of the router, and a second channel reservation bank associated with an output port of a plurality of output ports of the router, the first channel reservation bank to comprise a plurality of channel reservation slots that are each associated with a distinct circuit-switched channel of the input port and are to store direction information associated with a distinct channel reservation request, the second channel reservation bank to comprise a plurality of channel reservation slots that are each associated with a distinct circuit-switched channel of the output port, the router to:
receive first and second channel reservation requests via a packet-switched network;
store first information associated with the first channel reservation request in a first slot of the first channel reservation bank and store second information associated with the first channel reservation request in a first slot of the second channel reservation bank, wherein the first information uniquely identifies the output port of the plurality of output ports and the second information uniquely identifies the input port of the plurality of input ports;
store information associated with the second channel reservation request in a second slot of the first channel reservation bank;
establish a first portion of a first circuit-switched channel based on the first information stored in the first slot of the first channel reservation bank and establish a second portion of the first circuit-switched channel based on the second information stored in the first slot of the second channel reservation bank; and
establish at least a portion of a second circuit-switched channel based on the information stored in the second slot of the first channel reservation bank.

2. The processor of claim 1, the router further to simultaneously transfer first circuit-switched data via the first circuit-switched channel and second circuit-switched data via the second circuit-switched channel.

3. The processor of claim 1, wherein the first portion of the first circuit-switched channel is to communicate a tail signal indicating the end of a circuit data transfer.

4. The processor of claim 1, wherein the first portion of the first circuit-switched channel is to communicate a stream signal indicating the communication of circuit data with more data to follow.

5. The processor of claim 1, wherein each channel reservation slot of the first channel reservation bank is associated with a distinct circuit-switched channel and is to provide direction information associated with a channel reservation request to facilitate establishment of the respective circuit-switched channel.

6. The processor of claim 1, wherein the router is further to receive a third channel reservation request that is to comprise an indication of a channel reservation slot.

7. The processor of claim 6, wherein the router is further to block the third channel reservation request upon a determination that the channel reservation slot indicated by the third channel reservation request is not available in the first channel reservation bank.

8. The processor of claim 1, wherein the router is further to block a third channel reservation request upon a determination that each channel reservation slot of the first channel reservation bank is occupied.

9. The processor of claim 1, wherein the router is further to comprise a plurality of ports, each port to comprise a respective channel reservation bank, each channel reservation bank to comprise a plurality of channel reservation slots, each channel reservation slot to provide information associated with a channel reservation request to establish a circuit-switched channel.

10. An apparatus to comprise:
a plurality of ports of a router of a network on chip;
a plurality of channel reservation banks comprising a first channel reservation bank and a second channel reservation bank, the first channel reservation bank associated with an input port of the plurality of ports, the first channel reservation bank to comprise a plurality of channel reservation slots that are each to configure at least a portion of a distinct circuit-switched channel of the input port and store direction information associated with a distinct circuit-switched channel reservation, the second channel reservation bank associated with an output port of the plurality of ports, the second channel reservation bank to comprise a plurality of channel reservation slots that each configure at least a portion of a distinct circuit-switched channel of the output port; and
wherein a first channel reservation slot of the first channel reservation bank is to store an indication of the output port and a first channel reservation slot of the second channel reservation bank is to store an indication of the input port, wherein the indication of the input port is to establish a first portion of a circuit-switched channel through the input port and the output port and the indication of the output port is to establish a second portion of the circuit-switched channel through the input port and the output port.

11. The apparatus of claim 10, wherein the input port of the plurality of ports is to comprise a plurality of simultaneous circuit-switched channels through the input port, each circuit-switched channel configured based on information stored in a channel reservation slot of the channel reservation bank associated with the input port.

12. The apparatus of claim 10, wherein a channel reservation slot is to store direction information associated with a circuit-switched channel reservation.

13. The apparatus of claim 10, wherein first information associated with a circuit-switched channel reservation is to be stored in a first channel reservation slot of the first channel reservation bank and second information associated with the circuit-switched channel reservation is stored in the first channel reservation slot of the second channel reservation bank.

14. The apparatus of claim 13, wherein the first channel reservation slot has a position within the first channel reservation bank that is the same as the position of the first channel reservation within the second channel reservation bank.

15. The apparatus of claim 13, wherein the first channel reservation slot has a position within the first channel reservation bank that is different from the position of the first channel reservation within the second channel reservation bank.

16. A non-transitory machine readable medium including information to represent structures, when manufactured, to be configured to:
receive first and second channel reservation requests via a packet-switched network;
in association with the first channel reservation request, store a direction associated with the first channel reservation request in a first slot of a first channel reservation bank associated with an input port of a plurality of input ports of a router of a network on chip, the direction comprising an indication of an output port of a plurality of output ports of the router;
in associated with the first channel reservation request, store an indication of the input port in a first slot of a first channel reservation bank associated with the output port;
store information associated with the second channel reservation request in a second slot of the first channel reservation bank;
establish a first portion of a first circuit-switched channel based on the indication of the output port stored in the first slot of the first channel reservation bank associated with the input port;
establish a second portion of the first circuit-switched channel based on the indication of the input port stored in the first slot of the first channel reservation bank associated with the output port; and
establish at least a portion of a second circuit-switched channel based on the information stored in the second slot of the first channel reservation bank.

17. The medium of claim 16, the structures, when manufactured, to be further configured to simultaneously transfer first circuit-switched data via the first circuit-switched channel and second circuit-switched data via the second circuit-switched channel.

18. The medium of claim 16, the structures, when manufactured, to be further configured to:
store a mapping between the first slot of the first channel reservation bank associated with the output port and the first slot of the first channel reservation bank associated with the input port.

19. The medium of claim 18, the structures, when manufactured, to be further configured to establish at least a portion of the first circuit-switched channel based on the mapping.

20. A system to comprise:
a plurality of routers of a network on a chip;
a plurality of cores each associated with a respective router of the network on a chip, each of the routers to comprise:
a plurality of ports;
a plurality of channel reservation banks comprising a first channel reservation bank and a second channel reservation bank, the first channel reservation bank associated with an input port of the plurality of ports, the first channel reservation bank to comprise a plurality of channel reservation slots that each configure at least a portion of a distinct circuit-switched channel of the input port and are to store direction information associated with a distinct channel reservation request, the second channel reservation bank associated with an output port of the plurality of ports, the second channel reservation bank to comprise a plurality of channel reservation slots that each configure at least a portion of a distinct circuit-switched channel of the input port; and
wherein a first channel reservation slot of the first channel reservation bank is to store an indication of the output port and a first channel reservation slot of the second channel reservation bank is to store an indication of the input port, wherein the indication of the input port and the indication of the output port are to configure at least a portion of a circuit-switched channel through the input port and the output port.

* * * * *